Patented May 3, 1949

2,468,861

UNITED STATES PATENT OFFICE 2,468,861

PRODUCTION OF CHLORAL ALCOHOLATE

Walter Bridge, Birkenhead, and James Matchet, Liverpool, England, assignors to Imperial Chemical Industries Limited, a corporation of Great Britain No Drawing. Application November 16, 1944, Serial No. 563,800. In Great Britain December 20, 1943

6 Claims. (Cl. 260—615)

This invention relates to the production of organic compounds and more particularly to the chlorination of ethyl alcohol.

It is known that chloral can be produced by chlorinating ethyl alcohol, whereby chloral alcoholate is produced which can subsequently be decomposed with sulphuric acid to give chloral. Hitherto it has been the practice to carry out the chlorination in stages by a batch method. The chlorination is commenced at room temperature, or below, and continued at such temperatures until the reaction liquid is saturated with chlorine, the temperature is then raised in stages so that a further portion of chlorine is introduced at 50° C. to 60° C., and the remainder at 90° C. to 95° C. Approximately a third of the chlorine necessary to convert all the alcohol to chloral alcoholate is introduced at each stage. At the end of the chlorination the product is substantially all chloral alcoholate and can be reacted with the sulphuric acid forthwith. To maintain the necessary temperature during the first stage it is necessary to remove the considerable amount of heat which is generated by the chlorination by using a cooling medium such as brine. The disadvantage thus arises that there is needed cooling or refrigerating apparatus having a sufficient capacity to maintain the whole of the reactants at the necessary low temperature for only a fraction, of the order of a third, of the reaction time, while for the remainder of the time the refrigerating apparatus is lying idle.

According to the present invention, a process for the production of chloral alcoholate comprises chlorinating ethyl alcohol in a continuous manner by flowing ethyl alcohol through a plurality of vessels arranged in series while continuously introducing chlorine into each of said vessels below the surface of the liquid therein, separately controlling the temperature in each vessel, and collecting the reaction product which overflows from the last vessel in the series.

By this means the production of chloral alcoholate may be carried out in a continuous manner using a refrigerating or cooling plant which has only a fraction of the capacity (in the preferred form of the invention only a third of the capacity) of that necessary to produce chloral alcoholate at the same rate by the batch method, and which is not left idle for a major proportion of the time.

Advantageously the chlorination in the first vessel is carried out at a temperature not substantially higher than atmospheric until the liquid therein is saturated with chlorine. In the subsequent stages in the process the temperature is increased, a higher temperature being required in each successive stage. Two or more vessels may be employed for the chlorination. For example, when two vessels are used, the first vessel may be maintained at approximately room temperature by suitable cooling means, while the second vessel may be heated to about 90° C. to 95° C. Alternatively, three vessels may be used, the first being maintained at approximately room temperature, the second at an intermediate temperature of the order of 50° C., and the last at approximately 90° C. to 95° C.

In a preferred form of the invention an apparatus is used comprising two reaction vessels, the first of which is provided with an inlet for alcohol, an overflow by which liquid can be delivered to the second vessel, an inlet for chlorine below the level of the overflow, a stirrer, and a cooling coil or jacket through which cold water or brine can be passed so as to cool the liquid in the vessel while it is subjected to chlorination. The second vessel has approximately twice the capacity of the first and has an inlet for the liquid overflowing from the first, an overflow by which liquid can leave the vessel, an inlet for chlorine below the level of the overflow, a stirrer, and heating means whereby the liquid in the vessel can be maintained at a suitable temperature. Each vessel is also provided with an outlet through a reflux condenser for hydrogen chloride. By means of this apparatus alcohol can be chlorinated to chloral alcoholate in a continuous manner with the initial part of the chlorination (corresponding to the introduction of a third of the total chlorine) carried out at relatively low temperature in the first vessel, while the remainder of the chlorination is conducted in the second vessel at an elevated temperature which is suitably of the order of 90° C. to 95° C. For this purpose the first vessel is filled up to the overflow level with ethyl alcohol which has previously been chlorinated to the intermediate stage, and the second vessel is filled with chloral alcoholate and heated to 90° C. to 95° C. Alcohol is then fed steadily into the first vessel, and chlorine introduced into it at a rate sufficient to saturate the reacting liquid therein; chlorine is also introduced into the second vessel at substantially twice the rate of introduction into the first vessel. The total amount of chlorine introduced will then be sufficient to convert all the alcohol into chloral alcoholate. Each vessel is stirred, and the first one kept cool by circulating brine or water through the cooling coil or jacket; the supply of heat to the second vessel is also regulated so that the temperature of 90° C. to 95° C. is maintained. The alcohol is thus partially chlorinated in the first vessel, and the partially chlorinated material overflows into the second vessel where chlorination is completed. Completely chlorinated material overflows from the second vessel and may be collected in a receiver. The extent of the chlorination can most conveniently be checked by means of the density of the product, and preferably the process is conducted so as to give a product with a density at 20° C. between 78° Tw. and 85° Tw. Chlorination beyond this stage results in a material unduly contaminated with by-products, while chlorination to a less extent implies a lower conversion of the alcohol.

When carrying out the chlorination in three stages, three vessels of approximately equal capacity may suitably be used, and may be maintained respectively at approximately room temperature or below, at 50° C. to 55° C. and at 90° C. to 95° C. In this case chlorine should be supplied at approximately equal rates to each vessel.

In the first stage of the chlorination, the vessel may be maintained at a temperature within the range of approximately 0° C. to 30° C. It has been found that the efficiency of the conversion of the ethyl alcohol to chloral alcoholate increases slightly as the temperature at which the first stage is carried out is increased, the maximum efficiency being attained when a temperature of approximately 25° C. is employed. A temperature of about 20° C. to 25° C. is therefore preferred. An additional advantage resulting from the use of temperatures of the order of 20° C. to 30° C., rather than lower temperatures, is that water may be employed for cooling the vessel, instead of brine.

The chloral alcoholate may, if desired, be treated with concentrated sulphuric acid in known manner to isolate the chloral, or it may be used in any other desired manner. Thus it may be reacted with benzene or a halo- or nitro-derivative thereof in the presence of concentrated sulphuric acid to give the corresponding diphenyl trichloroethane.

The following example illustrates but does not limit the invention, all parts being parts by weight.

*Example*

Ethyl alcohol was chlorinated in an apparatus of the type described above having two reaction vessels in series, the second having twice the capacity of the first. The first vessel was charged with alcohol saturated with chlorine at room temperature and the second vessel with alcohol previously chlorinated to crude chloral alcoholate of density at 20° C. of 83° Tw.

The ethyl alcohol was fed continuously into the first vessel at the rate of 32 parts per hour and chlorine at the rate of 35.5 parts per hour, while the liquid in that vessel was maintained at 25° C. by cooling. Chlorine was supplied to the second vessel at the rate of 70 to 75 parts per hour and the temperature of the liquid in that vessel was maintained between 90° C. and 95° C. The sizes of the vessels were such that with the above input rates the average time of contact between the liquid and chlorine was 24 hours in the first vessel and 48 hours in the second vessel. The chloral alcoholate leaving the second vessel had a density at 20° C. of 78° Tw. to 80° Tw., a setting point of 23° C. and contained 63% to 65% chloral. For every 190 parts of alcohol 365 parts of crude alcoholate were obtained.

We claim:

1. A process for the production of chloral alcoholate, which comprises chlorinating ethyl alcohol in a continuous manner by flowing ethyl alcohol through a plurality of vessels arranged in series while continuously introducing chlorine into each of said vessels below the surface of the liquid therein, separately controlling the temperature in each vessel, the first vessel in the series being maintained at a temperature not substantially greater than atmospheric, and collecting the reaction product which overflows from the last vessel in the series.

2. A process according to claim 1, in which the chlorination in the first vessel in the series is continued until the liquid therein is saturated with chlorine.

3. A process according to claim 1, in which the temperature of the liquid in the first vessel in the series is maintained at approximately 25° C., and that in the last vessel at approximately 90° C. to 95° C.

4. A process for the production of chloral alcoholate, which comprises chlorinating ethyl alcohol in a continuous manner by flowing ethyl alcohol through two vessels arranged in series while continuously introducing chlorine into each of said vessels below the surface of the liquid therein, the second vessel having approximately twice the capacity of the first and chlorine being introduced into the second vessel at approximately twice the rate at which it is introduced into the first vessel, separately controlling the temperature in each vessel, the first vessel being maintained at a temperature not substantially greater than atmospheric, and collecting the reaction product which overflows from the last vessel in the series.

5. A process according to claim 4, in which the chlorination in the first vessel is continued until the liquid therein is saturated with chlorine.

6. A process according to claim 4, in which the temperature of the liquid in the first vessel is maintained at approximately 25° C., and that in the second vessel at approximately 90° C. to 95° C.

WALTER BRIDGE.
JAMES MATCHET.

REFERENCES CITED

The following references are of record in the file of this patent:

UNITED STATES PATENTS

| Number | Name | Date |
|---|---|---|
| 774,151 | Besson | Nov. 8, 1904 |
| 1,432,761 | Koch | Oct. 24, 1922 |
| 1,620,180 | Young et al. | Mar. 8, 1927 |

FOREIGN PATENTS

| Number | Country | Date |
|---|---|---|
| 17,202 | Great Britain | 1900 |

OTHER REFERENCES

Groggins, Unit Processes in Organic Synthesis, pages 190–207 (1935).

Callahan, "Chemical & Metallurgical Engineering," 51, Oct. 1944, pages 109 to 114.